(12) United States Patent
Oh et al.

(10) Patent No.: US 12,506,175 B2
(45) Date of Patent: Dec. 23, 2025

(54) ELECTROLYTE COMPOSITION AND LITHIUM BATTERY INCLUDING THE SAME

(71) Applicant: Electronics and Telecommunications Research Institute, Daejeon (KR)

(72) Inventors: Jimin Oh, Daejeon (KR); Kwang Man Kim, Daejeon (KR); Sung You Hong, Ulsan (KR); Nam Kyu Park, Ulsan (KR); Ho Seung Lee, Ulsan (KR); Young-Gi Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 757 days.

(21) Appl. No.: 17/861,472

(22) Filed: Jul. 11, 2022

(65) Prior Publication Data
US 2023/0120799 A1   Apr. 20, 2023

(30) Foreign Application Priority Data

Oct. 7, 2021   (KR) .................. 10-2021-0133315
Jan. 12, 2022   (KR) .................. 10-2022-0004480

(51) Int. Cl.
*H01M 10/00*   (2006.01)
*H01M 4/04*   (2006.01)
(Continued)

(52) U.S. Cl.
CPC ..... *H01M 10/0568* (2013.01); *H01M 4/0404* (2013.01); *H01M 10/0525* (2013.01);
(Continued)

(58) Field of Classification Search
CPC ......... H01M 10/0568; H01M 10/0525; H01M 10/0569; H01M 10/0567; H01M 4/0404
See application file for complete search history.

(56) References Cited

U.S. PATENT DOCUMENTS

| 7,399,556 B2 | 7/2008 | Lee et al. |
| 9,306,240 B2 | 4/2016 | Lee et al. |
(Continued)

FOREIGN PATENT DOCUMENTS

| CN | 102593516 A | * | 7/2012 |
| CN | 110429336 A |   | 11/2019 |
(Continued)

OTHER PUBLICATIONS

Xia et al., Phosphate Compound, Synthesis Method and Non-aqueous Electrolyte Thereof, Dec. 2020, See the Abstract. (Year: 2020).*

(Continued)

*Primary Examiner* — Tiffany Legette
*Assistant Examiner* — Monique M Wills
(74) *Attorney, Agent, or Firm* — NSIP Law

(57) ABSTRACT

A lithium battery according to the inventive concept includes: a first electrode structure; a second electrode structure separated from the first electrode structure; and an electrolyte between the first electrode structure and the second electrode structure, wherein the electrolyte includes: a lithium salt; an organic solvent; and at least one among a material represented by Formula 1 and a material represented by Formula 2.

[Formula 1]

(Continued)

-continued

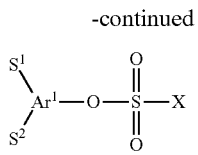

[Formula 2]

11 Claims, 9 Drawing Sheets

(51) Int. Cl.
H01M 10/0525 (2010.01)
H01M 10/0567 (2010.01)
H01M 10/0568 (2010.01)
H01M 10/0569 (2010.01)

(52) U.S. Cl.
CPC ... H01M 10/0567 (2013.01); H01M 10/0569 (2013.01); H01M 2300/0028 (2013.01)

(56) References Cited

U.S. PATENT DOCUMENTS

| 2014/0356733 | A1 | 12/2014 | Khasanov et al. | |
|---|---|---|---|---|
| 2020/0287242 | A1 | 9/2020 | Garsuch et al. | |
| 2020/0388881 | A1* | 12/2020 | Ji | H01G 11/26 |
| 2022/0115696 | A1* | 4/2022 | Lee | C07F 5/04 |

FOREIGN PATENT DOCUMENTS

| CN | 112110953 A | * | 12/2020 | ............ C07F 9/2408 |
|---|---|---|---|---|
| KR | 10-2014-0139906 A | | 12/2014 | |
| KR | 10-2015-0014895 A | | 2/2015 | |
| KR | 10-2019-0058134 A | | 5/2019 | |

OTHER PUBLICATIONS

Cao et al., Flame-retarded Lithium Ion Battery Electrolyte and Preparation Method Thereof, Jul. 2012, See the Abstract. (Year: 2012).*
Dangroo, N. A., et al. "An efficient synthesis of phosphoramidates from halides in aqueous ethanol." *Tetrahedron letters* 57.25 (May 3, 2016): pp. 2717-2722.
Cao, Xia, et al. "Novel phosphamide additive to improve thermal stability of solid electrolyte interphase on graphite anode in lithium-ion batteries." *ACS applied materials & interfaces* 5.22 (Nov. 27, 2013): pp. 11494-11497.
Pham, Hieu Quang, et al. "Non-flammable LiNi0, 8Co0. 1Mn0. 1O2 cathode via functional binder; stabilizing high-voltage interface and performance for safer and high-energy lithium rechargeable batteries." *Electrochimica Acta* 317 (Sep. 10, 2019): pp. 711-721.
Jung, Roland, et al. "Oxygen release and its effect on the cycling stability of LiNixMnyCozO2 (NMC) cathode materials for Li-ion batteries." *Journal of the Electrochemical Society* 164.7 (May 2, 2017): A1361.
Park, Min Woo, Sewon Park, and Nam-Soon Choi. "Unanticipated mechanism of the trimethylsilyl motif in electrolyte additives on nickel-rich cathodes in lithium-ion batteries." *ACS Applied Materials & Interfaces* 12.39 (Sep. 4, 2020): pp. 43694-43704.
Neisius, Matthias, et al. "Phosphoramidate-containing flame-retardant flexible polyurethane foams." *Industrial & Engineering Chemistry Research* 52.29 (Jul. 24, 2013): pp. 9752-9762.
Dong, Jiajia, et al. "SuFEx-Based Synthesis of Polysulfates." *Angewandte Chemie* 126.36 (Sep. 1, 2014): pp. 9620-9624.

* cited by examiner

ELECTROLYTE COMPOSITION AND LITHIUM BATTERY INCLUDING THE SAME

CROSS-REFERENCE TO RELATED APPLICATIONS

This U.S. non-provisional patent application claims priority under 35 U.S.C. § 119 of Korean Patent Application Nos. 10-2021-0133315, filed on Oct. 7, 2021, and 10-2022-0004480, filed on Jan. 12, 2022, the entire contents of which are hereby incorporated by reference.

BACKGROUND

The present disclosure herein relates to a lithium battery and more particularly, to an electrolyte composition of a lithium battery.

Secondary batteries may include lithium batteries. Recently, the applicability of lithium batteries is expanded. For example, lithium batteries are widely used as power sources of electric vehicles (EV) and energy storage systems (ESS). However, flame retardant additives are not used in commercial lithium batteries until now. Accordingly, side reactions at the interface layers of the electrodes of lithium batteries are not suppressed, and there are problems of inducing marked reduction of the cycle characteristics of lithium batteries.

SUMMARY

A technical task for solving in the present disclosure is to provide an electrolyte composition having improved flame retardant properties and stable electrochemical properties, and a lithium battery electrolyte including the same.

Another task for solving in the present disclosure is to provide a lithium battery having improved electrochemical properties.

The tasks to be solved by the inventive concept is not limited to the above-described tasks, however other tasks not mentioned will be precisely understood from the description below by a person skilled in the art.

The present disclosure relates to an electrolyte composition, a lithium battery including the same, and a manufacturing method of the lithium battery. An embodiment of the inventive concept provides a lithium battery including: a first electrode structure; a second electrode structure separated from the first electrode structure; and an electrolyte between the first electrode structure and the second electrode structure, wherein the electrolyte includes: a lithium salt; an organic solvent; and an additive including at least one among a material represented by Formula 1 and a material represented by Formula 2 below.

[Formula 1]

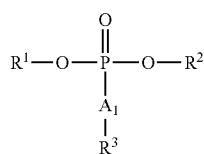

In Formula 1, $A_1$ is $CH_2$ or $N-R^4$, $R^1$ and $R^2$ are each independently an alkyl group of 1 to 4 carbon atoms, a halogen-substituted alkyl group of 1 to 4 carbon atoms, or an alkenyl group of 2 to 4 carbon atoms, $R^3$ and $R^4$ are each independently hydrogen, an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, at least one among $R^3$ and $R^4$ is an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, and in case where $A_1$ is carbon (C), $R^3$ is a substituted or unsubstituted heterocyclic compound of 3 to 6 carbon atoms.

[Formula 2]

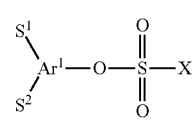

In Formula 2, $Ar^1$ is $C_nH_mO_aS_bN_c$, n is an integer between 6 and 20, m is 0.5n to 2n, a is a real number between 0 to 2, b is a real number between 0 and 2, c is a real number between 0 and 2, $S^1$ and $S^2$ are each independently hydrogen, a halogen atom, $-OSO_2F$, $-OCF_3$, $-OH$, $-NH_2$ or $-OP(OC_2H_5)_2=O$, and X is a halogen atom.

In an embodiment, the additive may include a material represented by Formula 1A below.

[Formula 1A]

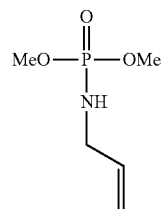

In Formula 1A, Me is $CH_3$.

In an embodiment, the additive may include a material represented by Formula 1B below.

[Formula 1B]

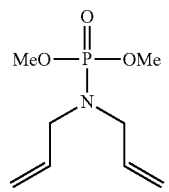

In Formula 1B, Me is $CH_3$.

In an embodiment, the additive may include a material represented by Formula 1C below.

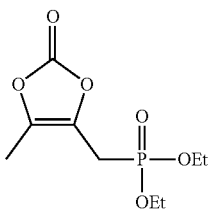
[Formula 1C]

In Formula 1C, Et is $CH_2CH_3$.

In an embodiment, the additive may include a material represented by Formula 2A below.

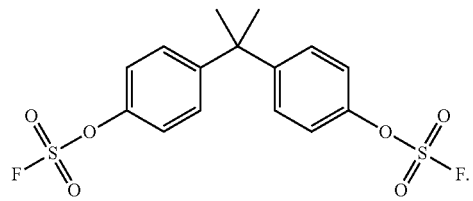
[Formula 2A]

In an embodiment, a composition ratio of the additive may be from about 0.5 wt % to about 30 wt %.

In an embodiment, the first electrode structure may include a first collector and a first electrode layer on the first collector, and the first electrode layer may be provided between the first collector and the electrolyte.

In an embodiment, the second electrode structure may include a second collector and a second electrode layer on the second collector, and the second electrode layer may be provided between the second collector and the electrolyte.

In an embodiment, the electrolyte may directly contact the first electrode layer and the second electrode layer.

In an embodiment, the lithium battery may further include a separator between the first electrode structure and the second electrode structure, and the electrolyte may be provided between the first electrode structure and the separator, and between the second electrode structure and the separator.

According to an embodiment of the inventive concept, there is provided an electrolyte composition including: a lithium salt; an organic solvent; and an additive including at least one among a material represented by Formula 1 and a material represented by Formula 2 below.

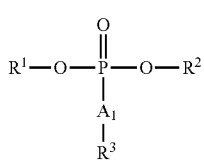
[Formula 1]

In Formula 1, $A_1$ is $CH_2$ or $N-R^4$, $R^1$ and $R^2$ are each independently an alkyl group of 1 to 4 carbon atoms, a halogen-substituted alkyl group of 1 to 4 carbon atoms, or an alkenyl group of 2 to 4 carbon atoms, $R^3$ and $R^4$ are each independently hydrogen, an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, at least one among $R^3$ and $R^4$ is an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, and in case where $A_1$ is carbon (C), $R^3$ is a substituted or unsubstituted heterocyclic compound of 3 to 6 carbon atoms.

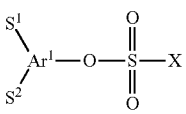
[Formula 2]

In Formula 2, $Ar^1$ is $C_nH_mO_aS_bN_c$, n is an integer between 6 and 20, m is 0.5n to 2n, a is a real number between 0 to 2, b is a real number between 0 and 2, c is a real number between 0 and 2, $S^1$ and $S^2$ are each independently hydrogen, a halogen atom, $-OSO_2F$, $-OCF_3$, $-OH$, $-NH_2$ or $-OP(OC_2H_5)_2=O$, and X is a halogen atom.

In an embodiment, in Formula 1, $A_1$ may be carbon (C), and $R^3$ may be dimethyl vinyl carbonate (4,5-dimethyl-1,3-dioxol-2-one), propylene carbonate or butylene carbonate (2,3-butylene carbonate).

In an embodiment, the additive may include a material represented by Formula 1A below.

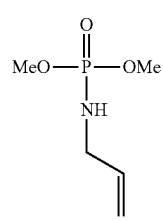
[Formula 1A]

In Formula 1A, Me is $CH_3$.

In an embodiment, the additive may include a material represented by Formula 1B below.

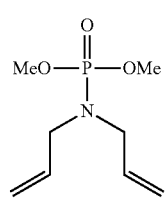
[Formula 1B]

In Formula 1B, Me is $CH_3$.

In an embodiment, the additive may include a material represented by Formula 1C below.

[Formula 1C]

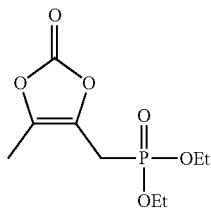

In Formula 1C, Et is $CH_2CH_3$.

In an embodiment, the additive may include a material represented by Formula 2A below.

[Formula 2A]

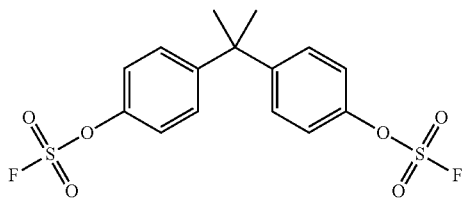

In an embodiment, a composition ratio of the additive may be about 0.5 wt % to about 30 wt %.

In an embodiment, a molarity of the lithium salt may be about 1 M to about 3 M.

In an embodiment, the lithium salt may include at least one among $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$.

In an embodiment, the organic solvent may include at least one among gamma-butyrolactone (g-butyrolactone), ethylene carbonate, propylene carbonate, glycerin carbonate, linear carbonate, dimethyl carbonate, diethyl carbonate, ethyl methyl carbonate, dimethoxyethane, and dimethyl ethylene carbonate.

In an embodiment, the electrolyte composition may further include an auxiliary agent, and the auxiliary agent may include at least one selected from fluoroethylene carbonate or vinylene carbonate.

BRIEF DESCRIPTION OF THE FIGURES

The accompanying drawings are included to provide a further understanding of the inventive concept and are incorporated in and constitute a part of this specification. The drawings illustrate embodiments of the inventive concept and, together with the description, serve to explain principles of the inventive concept. In the drawings.

DETAILED DESCRIPTION

Figure 1:
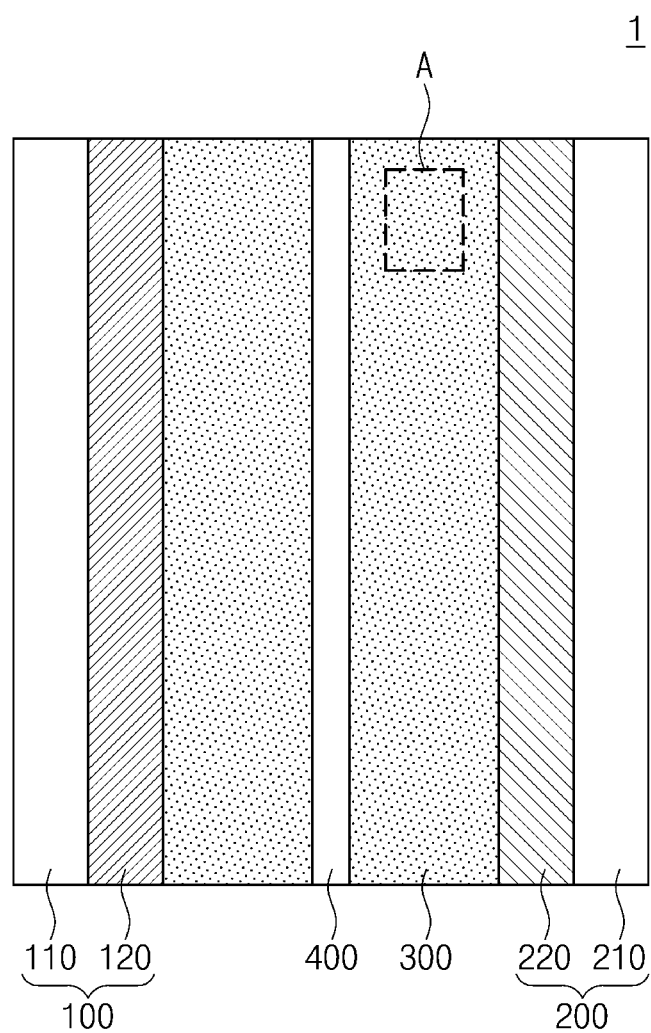
FIG. 1 is a cross-sectional view showing a lithium battery according to an embodiment of the inventive concept.

In order to sufficiently understand the configuration and effects of the inventive concept, preferred embodiments of the inventive concept will be explained with reference to accompanying drawings. However, the inventive concept is not limited to the embodiments disclosed hereinbelow and may be accomplished by various types, and various changes may be made. The disclosure of the inventive concept may, however, be completed through the explanation on the embodiments, and the embodiments are provided to completely notify a person having ordinary skill in this technical field in which the inventive concept belongs to of the scope of the inventive concept. A person having ordinary skill in this technical field may understand where the inventive concept could be conducted under what suitable environments.

The terminology used herein is for the purpose of describing particular embodiments only and is not intended to be limiting of the invention. As used herein, the singular forms, are intended to include the plural forms as well, unless the context clearly indicates otherwise. It will be further understood that the terms "comprises" and/or "comprising", when used in this specification, specify the presence of stated elements, steps, operations, and/or devices, but do not preclude the presence or addition of one or more other elements, steps, operations, and/or devices.

It will be understood that when a film (or layer) is referred to as being "on" another film (or layer), the film (or layer) can be directly on the other film (or layer), or intervening films (or layers) may be present.

In various embodiments described in the present disclosure, the terms first, second, third, etc. are used to describe various regions, films (or layers), etc., but these regions, films (or layers) should not be limited by these terms. These terms are used only to distinguish a certain region or film (or layer) from another region or film (or layer). Accordingly, a film material referred to as a first film material in an embodiment may be termed a second film material. Each embodiment explained and illustrated herein includes a complementary embodiment. Like reference numerals refer to like elements throughout.

The terms used in the embodiments of the inventive concept may be interpreted as commonly known meanings to a person skilled in the art unless otherwise defined.

In the present disclosure, examples of a halogen atom may include a fluorine atom, a chlorine atom, a bromine atom, or an iodine atom.

Hereinafter, referring to accompanying drawings, an electrolyte material, a lithium battery electrolyte, and a lithium battery according to the inventive concept will be explained.

FIG. 1 is a cross-sectional view showing a lithium battery according to an embodiment of the inventive concept.

Referring to FIG. 1, a lithium battery 1 may include a first electrode structure 100, a second electrode structure 200, and an electrolyte 300. The lithium battery 1 may further include a separator 400.

The first electrode structure 100 may include a first collector 110 and a first electrode layer 120. The first electrode structure 100 may play the role of a cathode. The first collector 110 may include a metal such as aluminum. The first electrode layer 120 may be disposed on the first collector 110. The first electrode layer 120 may be electrically connected with the first collector 110. The first electrode layer 120 may include a cathode active material, a conductive material, and a binder. The cathode active material may include, for example, at least one among sulfur, $LiCoO_2$, $LiNiO_2$, $LiNi_xCo_yMn_zO_2$ (x, y, z are real numbers of 0 or more, x+y+z=1) (hereinafter, NCM), $LiMn_2O_4$, and $LiFePO_4$. For example, the binder may include a fluorine-based polymer such as polyvinylidene fluoride (PVdF). The conductive material may include a carbon-containing material such as conductive amorphous carbon, carbon nanotube, and/or graphene. The first electrode layer 120 includes the binder and the conductive material, and the mechanical bonding strength and electroconductivity of the first electrode layer 120 may be improved. For example, the weight ratio of the active material:binder:conductive material in the first electrode layer 120 may be about 80:10:10 to about 94:3:3.

The second electrode structure 200 may be separated from the first electrode structure 100 and may face thereto. The second electrode structure 200 may include a second collector 210 and a second electrode layer 220. The second electrode structure 200 may play the role of an anode. The second electrode layer 220 may be disposed between the second collector 210 and the first electrode layer 120. The second collector 210 may include a metal such as copper. The second electrode layer 220 may be disposed on the second collector 210. The second electrode layer 220 may be electrically connected with the second collector 210. The second electrode layer 220 may include an anode active material and a second binder. The anode active material may include a carbon-based material (for example, natural graphite and/or synthetic graphite) or a noncarbon-based material (for example, silicon, silicon oxide, and/or a lithium metal). The second binder may include a cellulose-based binder and/or an organic binder. The second binder may include, for example, at least one among cellulose (carboxymethyl cellulose, CMC), styrene-butadiene rubber (SBR), emulsion and PVdF. The weight ratio of the anode active material and the second binder may be about 90:10 to about 99:1.

The second electrode layer 220 may further include a second conductive material. The second conductive material may include, for example, at least one among conductive amorphous carbon, carbon nanotube, graphene and a conductive polymer. The amount ratio of the second conductive material in the second electrode layer 220 may be about 0.5 wt % to about 1 wt %.

A separator 400 may be disposed between the first electrode structure 100 and the second electrode structure 200. The separator may be provided between the first electrode layer 120 and the second electrode layer 220, and may be separated from the first electrode layer 120 and the second electrode layer 220. The separator 400 may include a base layer and a coating layer. The base layer may include a polymer. For example, the base layer may include at least one of polyolefin such as polyethylene and polypropylene, and cellulose. The separator may include a porous polymer layer or a non-woven fabric. The coating layer may cover the base layer. In an embodiment, the coating layer may include an inorganic material such as $Al_2O_3$, $TiO_2$, and $SiO_2$. In another embodiment, the coating layer may include cellulose (carboxymethyl cellulose, CMC), styrene-butadiene rubber (SBR), polyvinylidene fluoride (PVdF), and/or mixtures thereof. In another embodiment, the coating layer may include an inorganic material and an organic material.

An electrolyte 300 may be disposed between the first electrode structure 100 and the second electrode structure 200. For example, the electrolyte 300 may fill up a gap region between the first electrode layer 120 and the separator 400, and a gap region between the second electrode layer 220 and the separator 400. Ions may move between the first electrode structure 100 and the second electrode structure 200 though the electrolyte 300. The ions may be lithium ions. Hereinafter, an electrolyte according to embodiments will be explained in more detail.

Figure 2:
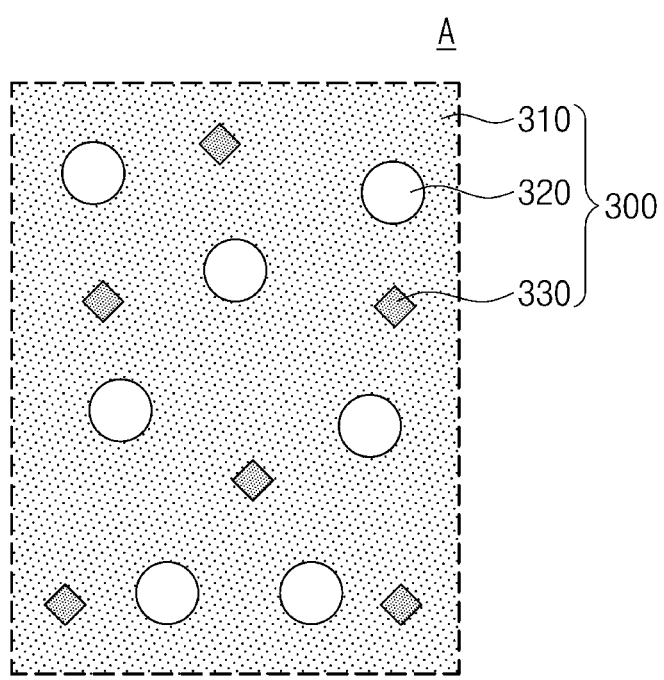
FIG. 2 is a diagram for explaining an electrolyte according to embodiments, and is an enlarged diagram of region A in FIG. 1.

FIG. 2 is a diagram for explaining an electrolyte according to embodiments, and is an enlarged diagram of region A in FIG. 1. Hereinafter, overlapping contents as the explanation above will be omitted.

Referring to FIG. 2, an electrolyte 300 may include an electrolyte composition. The electrolyte 300 may include a liquid electrolyte. The electrolyte composition may include an organic solvent 310, a lithium salt 320, and an additive 330. The lithium salt 320 may include at least one among $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_3$. The molarity of the lithium salt 320 in the electrolyte 300 may be from about 1 M to about 3 M (mol/g). The organic solvent 310 may include cyclic carbonate or linear carbonate. In an embodiment, the cyclic carbonate may include at least one among gamma-butyrolactone (g-butyrolactone), ethylene carbonate, propylene carbonate, and glycerin carbonate. In an embodiment, the linear carbonate may include at least one among dimethyl carbonate, diethyl carbonate, ethyl methyl carbonate, dimethoxyethane, and dimethyl ethylene carbonate. The electrolyte 300 may be a nonaqueous electrolyte. For example, the electrolyte 300 may not include an aqueous solvent (for example, water).

The electrolyte composition may further include an auxiliary agent. The auxiliary agent may include a different material from the organic solvent 310, the lithium salt 320 and the additive 330. The auxiliary agent may include, for example, fluoroethylene carbonate or vinylene carbonate. Accordingly, the initial capacity characteristics, coulomb efficiency, and/or cycle characteristics of a lithium battery may be improved. In addition, the interface properties between the electrolyte 300 and the first electrode layer (120 in FIG. 1), and the interface properties between the electrolyte 300 and the second electrode layer (220 in FIG. 1) may be improved.

The additive 330 may include at least one among a material represented by Formula 1 and a material represented by Formula 2.

[Formula 1]

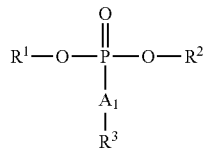

In Formula 1, $A_1$ is $CH_2$ or $N-R^4$, $R^1$ and $R^2$ are each independently an alkyl group of 1 to 4 carbon atoms, a halogen-substituted alkyl group of 1 to 4 carbon atoms, or an alkenyl group of 2 to 4 carbon atoms, $R^3$ and $R^4$ are each independently hydrogen, an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms,

- at least one among $R^3$ and $R^4$ is hydrogen, an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, and
- in case where $A_1$ is carbon (C), $R^3$ may include a substituted or unsubstituted heterocyclic compound of 3 to 6 carbon atoms.

In Formula 1, the halogen-substituted alkyl group may include at least one among a fluorine-substituted alkyl group, a chlorine-substituted alkyl group, a bromine-substituted alkyl group, and an iodine-substituted alkyl group.

In Formula 1, the heterocyclic compound may include dimethyl vinyl carbonate (4,5-dimethyl-1,3-dioxol-2-one), propylene carbonate or butylene carbonate (2,3-butylene carbonate). That is, in Formula 1, $A_1$ may be carbon (C), and $R^3$ may be dimethyl vinyl carbonate (4,5-dimethyl-1,3-dioxol-2-one), propylene carbonate or butylene carbonate (2,3-butylene carbonate).

The material represented by Formula 1 may include at least one among materials represented by Formula 1A, Formula 1B, and Formula 1C.

[Formula 1A]

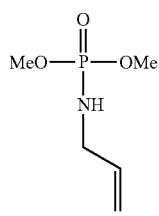

In Formula 1A, Me is $CH_3$.

The material represented by Formula 1A may be dimethyl allylphosphoramidate.

[Formula 1B]

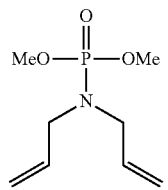

In Formula 1B, Me is $CH_3$.

The material represented by Formula 1B may be dimethyl diallylphosphoramidate.

[Formula 1C]

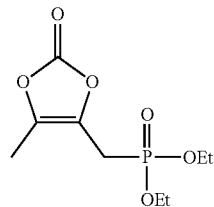

In Formula 1C, Et is $CH_2CH_3$.

The material represented by Formula 1C may be dimethylvinylenecarbonyl diethyl phosphonate ester.

The additive 330 may include a material represented by Formula 2.

[Formula 2]

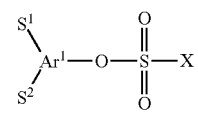

In Formula 2, $Ar^1$ is $C_nH_mO_aS_bN_c$, n is an integer between 6 and 20, m is 0.5n to 2n, a is a real number between 0 to 2, b is a real number between 0 and 2, c is a real number between 0 and 2, $S^1$ and $S^2$ are each independently hydrogen, a halogen atom, $-OSO_2F$, $-OCF_3$, $-OH$, $-NH_2$ or $-OP(OC_2H_5)_2=O$, and X is a halogen atom.

In Formula 2, X may be F, Cl, Br or I. For example, in Formula 2, X may be F.

The material represented by Formula 2 may include a material represented by Formula 2A.

[Formula 2A]

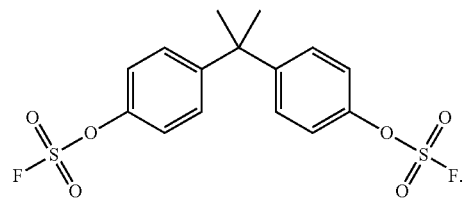

The material represented by Formula 2A may be propane-2,2-diylbis(4,1-phenylene)difluorosulfate.

Referring to FIG. 1 and FIG. 2, the composition ratio of the additive 330 may be about 0.5 wt % to about 30 wt % of the electrolyte composition. Since the additive 330 is about 0.5 wt % or more, the flame retardant properties of an electrolyte may be sufficiently improved. Since the additive 330 is about 30 wt % or less, the lithium battery 1 including the electrolyte composition may have improved electrochemical properties. For example, if the additive 330 is greater than about 30 wt %, lithium ion mobility between the electrolyte 330 and the first and second electrode layers 120 and 220 may be reduced, or the side reactions of the electrolyte 300 may occur. The side reactions of the electrolyte 300 may be undesired reactions.

Generally, if the lithium battery includes a cathode material such as NCM, the crystal lattice of NCM may undergo phase transition during a process of charging to a high voltage of about 4.3 V or higher (for example, about 4.4 V or about 4.6 V). For example, the hexagonal phase in NCM may undergo phase transition to a monoclinic phase. Otherwise, different hexagonal phases included in NCM may undergo phase transition from each other. Accordingly, oxygen may be discharged from a cathode active material, and the electrical capacity of the lithium battery 1 may be reduced. In this case, the use of the cathode active material may be restricted to a specific material.

According to embodiments of the inventive concept, the additive 330 may include at least one among a P element, an N element, and an S element. Accordingly, the type of the cathode active material is not limited, and the lithium battery 1 may be charged to a high voltage. Though the lithium battery 1 according to embodiments is charged to a high voltage, the phase transition of crystal lattice in the cathode active material may not occur. Accordingly, the oxygen discharge from a cathode active material may be delayed.

According to embodiments, the electrolyte composition includes the additive 330, and electrodeposition reaction at the interface between the second electrode layer 220 and the electrolyte 300 may be suppressed. The electrolyte 300 has flame retardant properties, and the lithium battery 1 may be driven stably. The restriction on the type of the cathode active material is reduced, and the first electrode layer 120 or the second electrode layer 220 may include a material with a high energy density. Though the lithium battery 1 includes a first electrode layer 120 or a second electrode layer 220 of with high energy density, the cycle of the lithium battery 1 may show stable characteristics.

According to embodiments, the additive 330 may have flame retardant properties. The flame retardant properties may be confirmed through the evaluation of self-extinguishing time. The additive 330 includes at least one among a P element, an N element, and an S element, and chemical and electrochemical stability may be shown. Under a relatively high voltage (for example, a voltage of about 4.3 V or higher) conditions, electrochemical reactions may be performed stably at the first electrode layer 120. The electrochemical reactions may correspond to the charging and discharging of the lithium battery 1. In addition, the decomposition reaction of the electrolyte 300 is suppressed, and the cycle characteristics of the lithium battery 1 may be improved. Accordingly, the charge and discharge efficiency, rate performance properties and retention of the lithium battery 1 may be improved.

Hereinafter, the preparation of an additive, the preparation of an electrolyte composition, and the manufacture of a lithium battery will be explained referring to the Experimental Examples of the inventive concept.

[Synthesis of Additive]
1. Synthesis of Additive Represented by Formula 1A

To a preliminary mixture of 25 mL of acetonitrile and dimethyl chlorophosphate (1.9 mL, 20 mmol, 1.0 eq), allylamine (1.80 mL, 24 mmol, 1.2 eq) and triethylamine (3.37 mL, 24 mmol, 1.2 eq) were added at about 0° C. to prepare a mixture. The mixture was stirred at about 25° C. for about 2 hours to perform the reaction represented by Reaction 1A below. The reaction may be a nucleophilic substitution reaction. After finishing the reaction, a white precipitate was separated from an organic layer obtained using a filter paper. After adding a solvent to the organic layer, the organic layer and the solvent were separated. The solvent included ethyl acetate and purified water. To the solvent thus separated, dichloromethane was added, and remaining organic material in the solvent was extracted. The remaining organic material and the organic layer were distilled under a reduced pressure to obtain Product 1A.

[Reaction 1A]

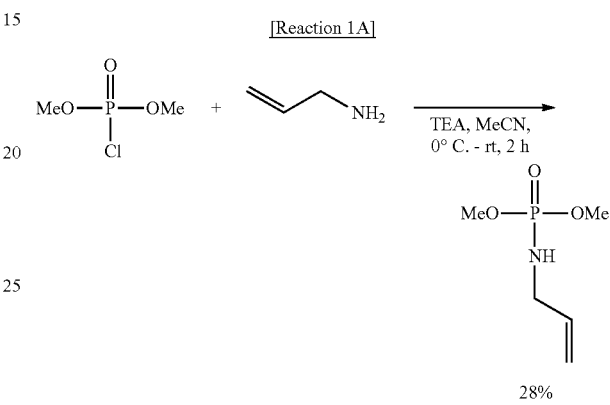

Figure 3A:
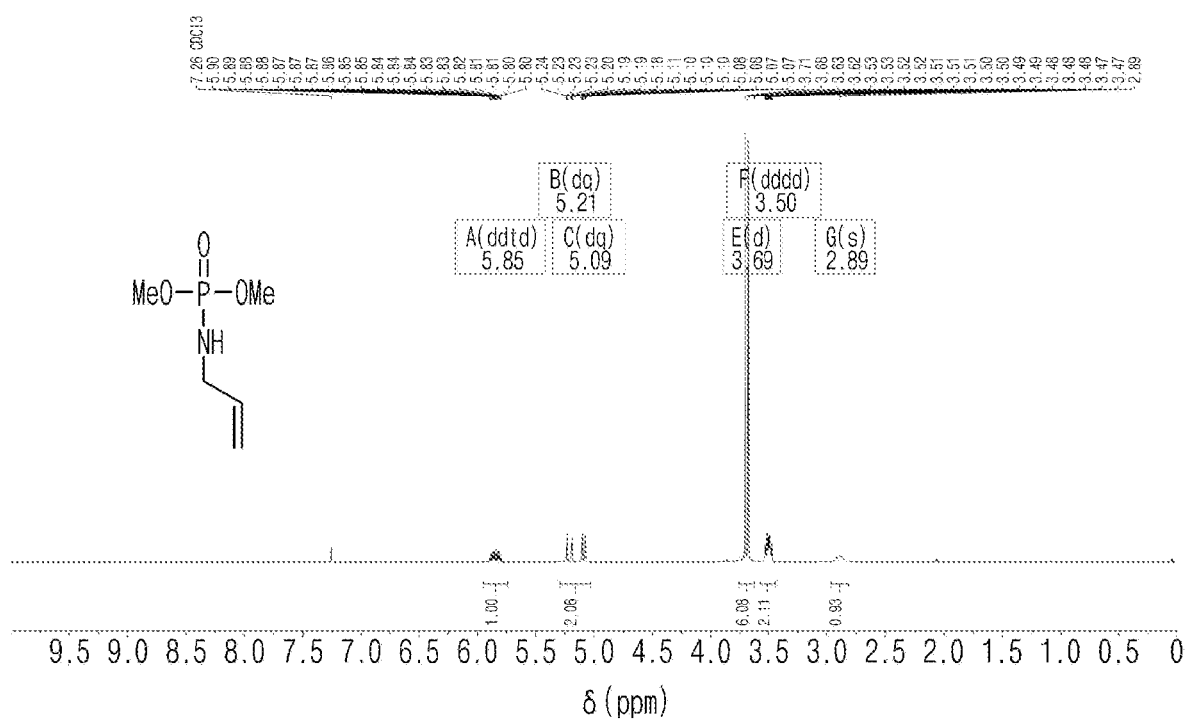
FIG. 3A shows nuclear magnetic resonance spectrum ($^1$H NMR) results of Product 1A.

In Reaction 1A, Me is $CH_3$.
[Yield Analysis]
The mass of Product 1A was 949 mg. The yield was analyzed as 28%.
[Nuclear Magnetic Resonance (NMR) Analysis]
FIG. 3A shows nuclear magnetic resonance spectrum ($^1$H NMR) results of Product 1A.
Referring to FIG. 3A, the chemical shift values (δ) of Product 1A measured by $^1$H NMR (400 MHz, $CDCl_3$) were δ 5.90-5.80 (m, 1H), 5.21 (dq, J=17.1, 1.6 Hz, 1H), 5.09 (dq, J=10.3, 1.5 Hz, 1H), 3.69 (d, J=11.2 Hz, 6H), 3.50 (dddd, J=12.1, 5.4, 3.2, 1.6 Hz, 2H), and 2.89 (br, 1H).

2. Synthesis of Additive Represented by Formula 1B

To a preliminary mixture of 25 mL of acetonitrile and dimethyl chlorophosphate (1.9 mL, 20 mmol, 1.0 eq), diallylamine (1.80 mL, 24 mmol, 1.2 eq) and triethylamine (3.37 mL, 24 mmol, 1.2 eq) were added at about 0° C. to prepare a mixture. The mixture was stirred at about 25° C. for about 2 hours to perform the reaction represented by Reaction 1B below. The reaction may be a nucleophilic substitution reaction. After finishing the reaction, a white precipitate was separated from an organic layer obtained using a filter paper. After adding a solvent to the organic layer, the organic layer and the solvent were separated. The solvent included ethyl acetate and purified water. To the solvent thus separated, dichloromethane was added, and remaining organic material in the solvent was extracted. The remaining organic material and the organic layer were distilled under a reduced pressure to obtain Product 1B.

[Reaction 1B]

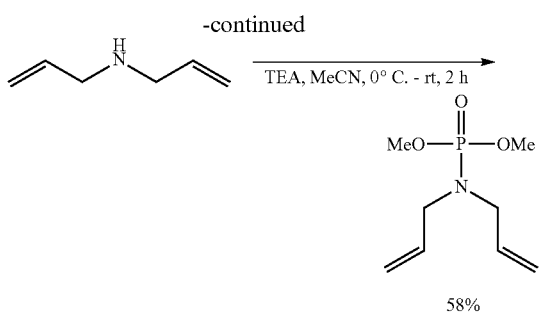

58%

In Reaction 1B, Me is $CH_3$.

[Yield Analysis]

The mass of Product 1B was 2.36 g. The yield was analyzed as 57%.

[Nuclear Magnetic Resonance (NMR) Analysis]

Figure 3B:
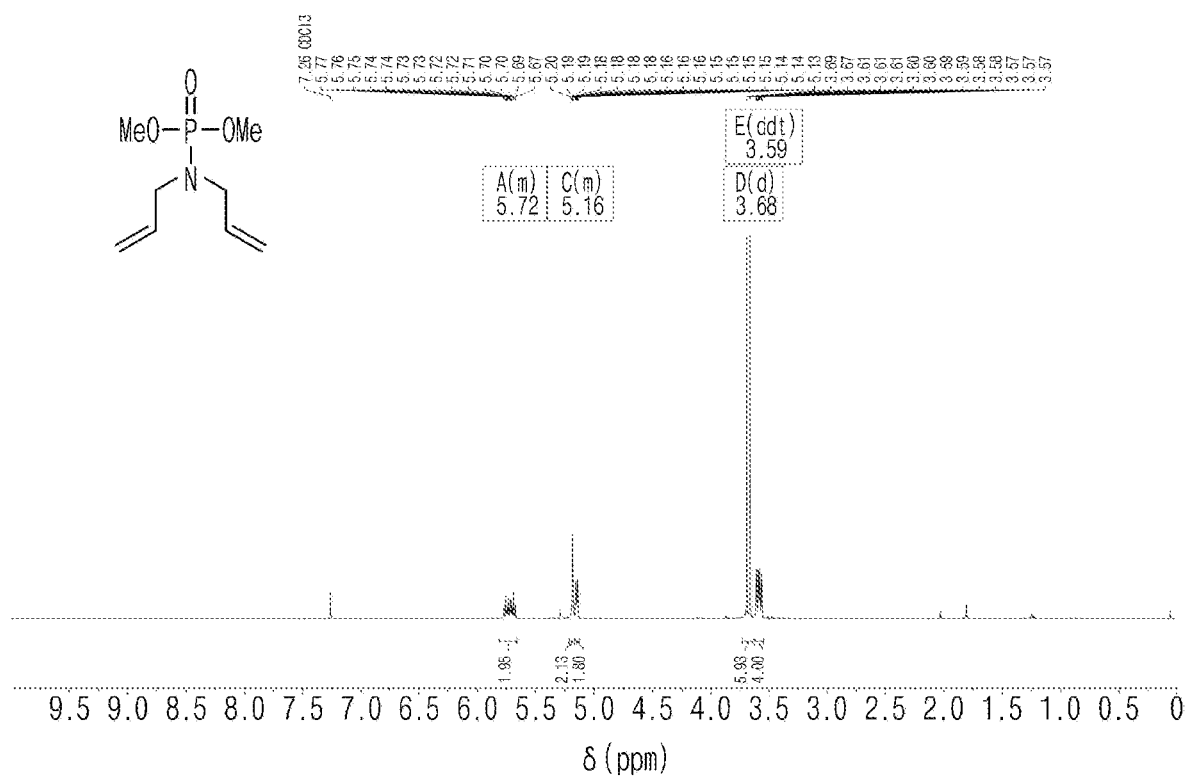
FIG. 3B shows nuclear magnetic resonance spectrum ($^1$H NMR) results of Product 1B.

FIG. 3B shows nuclear magnetic resonance spectrum ($^1H$ NMR) results of Product 1B.

Referring to FIG. 3B, the chemical shift values ($\delta$) of Product 1B measured by $^1H$ NMR (400 MHz, $CDCl_3$) were $\delta$ 5.80-5.65 (m, 2H), 5.23-5.11 (m, 4H), 3.68 (d, J=11.2 Hz, 6H), and 3.59 (ddt, J=10.9, 6.2, 1.3 Hz, 4H).

3. Synthesis of Additive Represented by Formula 1C

Bromodimethyl vinyl carbonate (386 μL, 2 mmol) and triethylphosphite (343 μL, 2 mmol, 1.0 eq) were stirred using a reflux condenser at about 80° C. for about 24 hours. The reaction represented by Reaction 1C below was performed. The reaction may be Michaelis-Arbuzov reaction. After finishing the reaction, Product 1C was obtained by using a flash chromatography method.

[Reaction 1C]

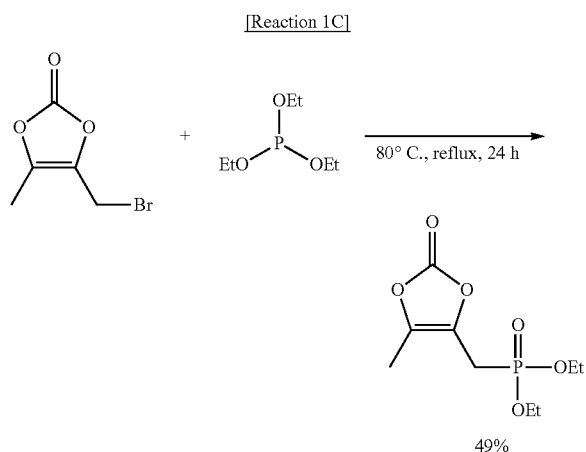

49%

In Reaction 1C, Et is $CH_2CH_3$.

[Yield Analysis]

The mass of Product 1C was 244 mg. The yield was analyzed as 49%.

[Nuclear Magnetic Resonance (NMR) Analysis]

Figure 3C:
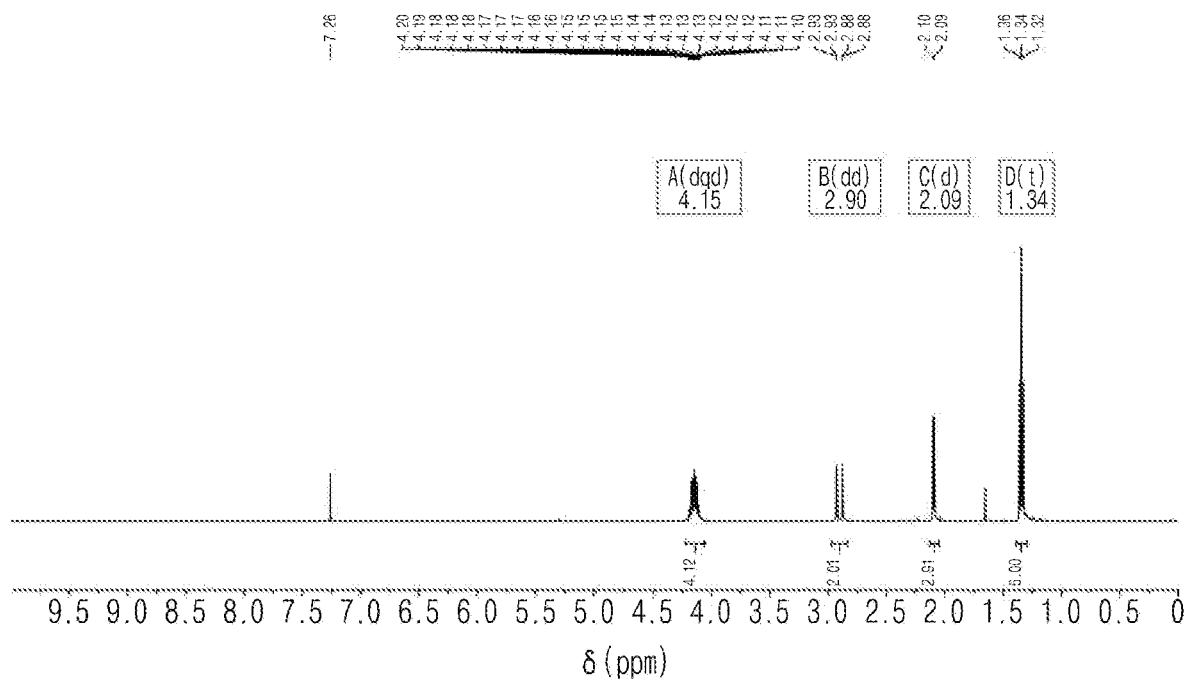
FIG. 3C shows nuclear magnetic resonance spectrum ($^1$H NMR) results of Product 1C.

FIG. 3C shows nuclear magnetic resonance spectrum ($^1H$ NMR) results of Product 1C.

Referring to FIG. 3C, the chemical shift values ($\delta$) of Product 1C measured by $^1H$ NMR (400 MHz, $CDCl_3$) were $\delta$ 4.15 (dqd, J=7.9, 7.1, 2.5 Hz, 4H), 2.90 (dd, J=20.3, 0.9 Hz, 2H), 2.10 (d, J=5.1 Hz, 3H), and 1.34 (t, J=7.1 Hz, 6H).

4. Synthesis of Additive Represented by Formula 2A

To a preliminary mixture of 20 mL of acetonitrile and triethylamine (2.23 mL, 16 mmol, 1.6 eq), bisphenol A (1.14 g, 5 mmol) and 1-(fluorosulfonyl)-2,3-dimethyl-1H-imidazol-3-ium trifluoromethanesulfonate (4.47 g, 13 mmol, 1.3 eq) were added at about 25° C. to prepare a mixture. The mixture was stirred at about 25° C. for about 1 hour to perform the reaction represented by Reaction 2A below. At this point, a solvent was added. The solvent included ethyl acetate and purified water. After finishing the reaction, an organic layer produced and the solvent were separated. To the solvent, dichloromethane was added, and a remaining organic material was extracted. The organic material and the organic layer were distilled under a reduced pressure to obtain a concentrated product. The concentrated product was purified through flash chromatography to obtain Product 2A.

[Reaction 2A]

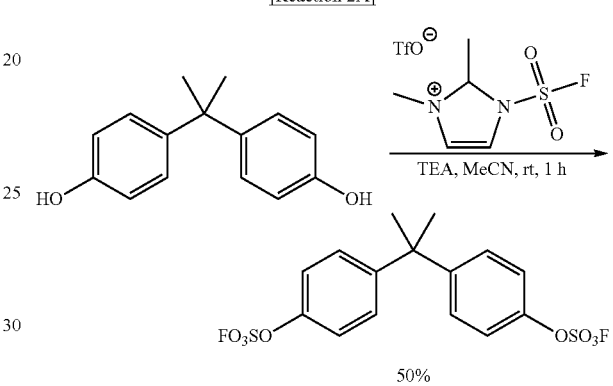

50%

[Yield Analysis]

The mass of Product 2A was 1.2 g. The yield was analyzed as 60%.

[Nuclear Magnetic Resonance (NMR) Analysis]

Figure 3D:
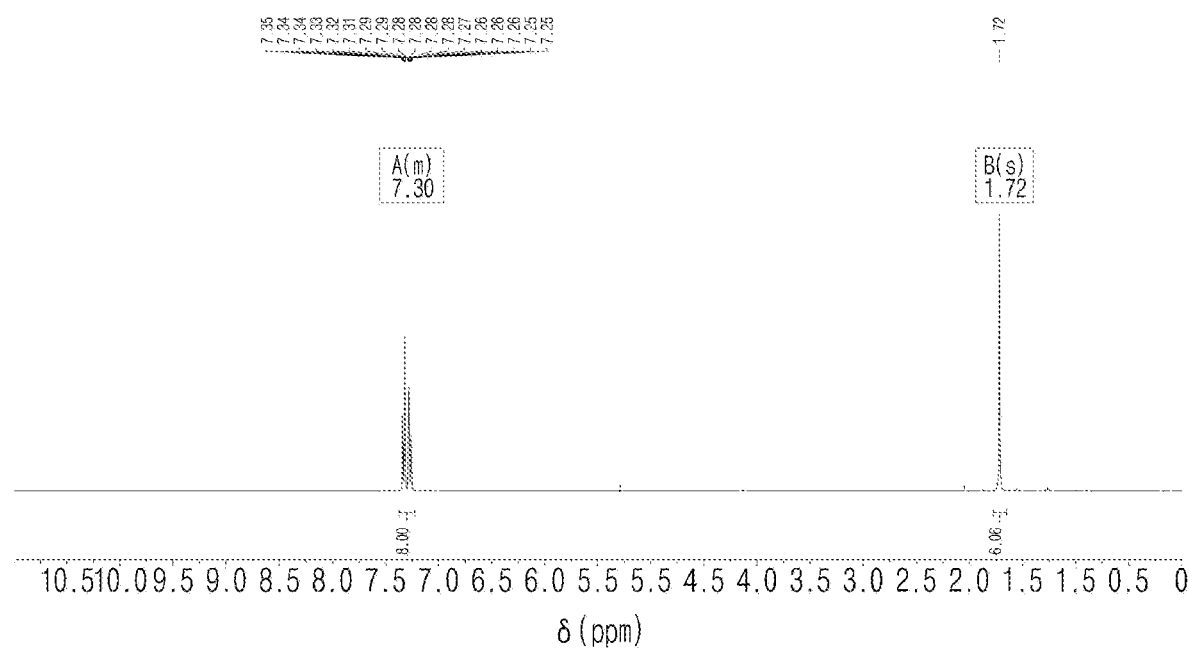
FIG. 3D shows nuclear magnetic resonance spectrum ($^1$H NMR) results of Product 2A.

FIG. 3D shows nuclear magnetic resonance spectrum ($^1H$ NMR) results of Product 2A.

Referring to FIG. 3D, the chemical shift values ($\delta$) of Product 2A measured by $^1H$ NMR (400 MHz, $CDCl_3$) were $\delta$ 7.59-7.13 (m, 8H), 1.72 (s, 6H).

Figure 3E:
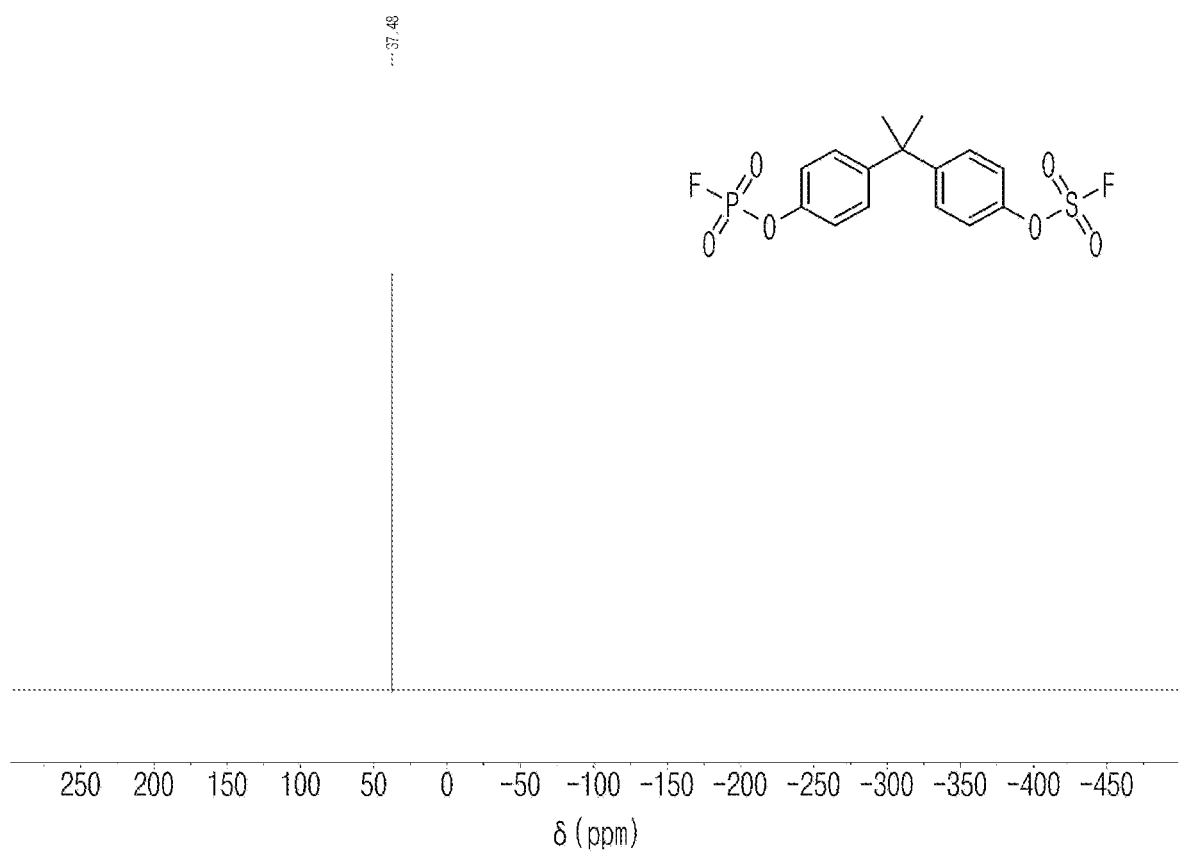
FIG. 3E shows nuclear magnetic resonance spectrum (19F NMR) results of Product 2A.

FIG. 3E shows nuclear magnetic resonance spectrum ($^{19}F$ NMR) results of Product 2A.

Referring to FIG. 3E, the chemical shift value ($\delta$) of Product 2A measured by $^{19}F$ NMR (377 MHz, $CDCl_3$) was $\delta$ 37.48.

[Manufacture and Evaluation of Lithium Battery]

1. Experimental Example 1A (1) Manufacture of Lithium Battery (Manufacture of a cathode structure) A $Li(Ni_{0.9}Co_{0.05}Mn_{0.05})O_2$ active material (NCM active material) was prepared by mixing lithium, nickel, cobalt, and manganese. $Li(Ni_{0.9}Co_{0.05}Mn_{0.05})O_2$ active material:carbon black conductive material:polyvinylidene fluoride binder in a weight percent of about 94:3:3 were added to a N-methyl-2-pyrrolidone (NMP) solvent to prepare a mixture. The mixture was applied on a cathode collector, and drying and a roll pressing process were performed to manufacture a cathode structure. In this case, an aluminum foil with a thickness of about 10 μm was used as the cathode collector.

(Manufacture of anode electrode layer) A lithium foil with a thickness of about 300 μm was prepared as an anode electrode layer.

(Preparation of electrolyte) To a preliminary mixture obtained by mixing ethylene carbonate and ethyl methyl carbonate in a volume ratio of about 3:7, about 1 M of a lithium salt (LiPF$_6$) was added to prepare a mixture. To the mixture, fluoroethyl carbonate (FEC) and the additive of Product 1A were added to prepare an electrolyte composition. In this case, the fluoroethyl carbonate (FEC) was about 5 wt % based on the electrolyte composition, and the additive of Product 1A was about 10 wt % based on the electrolyte composition.

(Manufacture of separator) A polyethylene porous film was prepared as a separator.

(Manufacture of lithium battery) The cathode structure, separator, and anode electrode layer were stacked in order. Between the cathode structure and the anode electrode layer, the electrolyte composition was injected to manufacture a lithium battery of Experimental Example 1A. The lithium battery may be a 2032-type coin cell.

(2) Evaluation of Charge and Discharge Characteristics of Lithium Battery

By using the charge and discharge cycler, the formation process of the lithium battery of Experimental Example 1A was performed. The formation process performed 4 cycles. At the first cycle, charge and discharge were performed at a speed of about 0.1 C-rate in a range of about 3-4.3 V in a constant current (hereinafter, CC) mode. At the second to fourth cycles, charge and discharge were performed at a speed of about 0.2 C-rate in a CC mode and at about 0.02 C-rate in a constant voltage (hereinafter, CV) mode, step by step and continuously. After the formation process, three cycles of charge and discharge of the lithium battery were performed in an order of about 0.3, 0.5, 1, 2, and 5 C-rate for each. Then, one cycle of charge and discharge of the lithium battery were performed in constant current and constant voltage modes of about 0.03, 0.05, 0.1, 0.2, 0.5 and 0.1 C-rate. After that, 50 cycles of charge and discharge of the lithium battery were performed under 1 C-rate conditions.

2. Experimental Example 1B (1) Manufacture of Lithium Battery (Manufacture of a cathode structure) Li(Ni$_{0.9}$Co$_{0.05}$Mn$_{0.05}$)O$_2$ active material:carbon black conductive material:polyvinylidene fluoride binder in a weight percent of about 94:3:3 were added to a N-methyl-2-pyrrolidone (NMP) solvent to prepare a mixture. The mixture was applied on a cathode collector, and drying and a roll pressing process were performed to manufacture a cathode structure. In this case, an aluminum foil with a thickness of about 10 μm was used as the cathode collector.

(Manufacture of anode electrode layer) A lithium foil with a thickness of about 300 μm was prepared as an anode electrode layer.

(Preparation of electrolyte) To a preliminary mixture obtained by mixing ethylene carbonate and ethyl methyl carbonate in a volume ratio of about 3:7, about 1 M of a lithium salt (LiPF$_6$) was added to prepare a mixture. To the mixture, fluoroethyl carbonate (FEC) and the additive of Product 1B were added to prepare an electrolyte composition. In this case, the fluoroethyl carbonate (FEC) was about 5 wt % based on the electrolyte composition, and the additive of Product 1B was about 10 wt % based on the electrolyte composition.

(Manufacture of separator) A polyethylene porous film was prepared as a separator.

(Manufacture of lithium battery) The cathode structure, separator, and anode electrode layer were stacked in order. Between the cathode structure and the anode electrode layer, the electrolyte composition was injected to manufacture a lithium battery of Experimental Example 1B. The lithium battery of Experimental Example 1B may be a 2032-type coin cell.

(2) Evaluation of Charge and Discharge Characteristics of Lithium Battery

The charge and discharge characteristics of the lithium battery of Experimental Example 1B were evaluated. The evaluation of the charge and discharge characteristics of the lithium battery was performed by the same conditions explained in Experimental Example 1A.

3. Experimental Example 1C (1) Manufacture of Lithium Battery (Manufacture of a cathode structure) Li(Ni$_{0.9}$Co$_{0.05}$Mn$_{0.05}$)O$_2$ active material:carbon black conductive material:polyvinylidene fluoride binder in a weight percent of about 94:3:3 were added to a N-methyl-2-pyrrolidone (NMP) solvent to prepare a mixture. The mixture was applied on a cathode collector, and drying and a roll pressing process were performed to manufacture a cathode structure. In this case, an aluminum foil with a thickness of about 10 μm was used as the cathode collector.

(Manufacture of anode electrode layer) A lithium foil with a thickness of about 300 μm was prepared as an anode electrode layer.

(Preparation of electrolyte) To a preliminary mixture obtained by mixing ethylene carbonate and ethyl methyl carbonate in a volume ratio of about 3:7, about 1 M of a lithium salt (LiPF$_6$) was added to prepare a mixture. To the mixture, fluoroethyl carbonate (FEC) and the additive of Product 1C were added to prepare an electrolyte composition. In this case, the fluoroethyl carbonate (FEC) was about 5 wt % based on the electrolyte composition, and the additive of Product 1C was about 10 wt % based on the electrolyte composition.

(Manufacture of separator) A polyethylene porous film was prepared as a separator.

(Manufacture of lithium battery) The cathode structure, separator, and anode electrode layer were stacked in order. Between the cathode structure and the anode electrode layer, the electrolyte composition was injected to manufacture a lithium battery of Experimental Example 1C. The lithium battery of Experimental Example 1C may be a 2032-type coin cell.

(2) Evaluation of Charge and Discharge Characteristics of Lithium Battery

The charge and discharge characteristics of the lithium battery of Experimental Example 1C were evaluated. The evaluation of the charge and discharge characteristics of the lithium battery was performed by the same conditions explained in Experimental Example 1A.

4. Experimental Example 2

(1) Manufacture of Lithium Battery (Manufacture of a cathode structure) Li(Ni$_{0.9}$Co$_{0.05}$Mn$_{0.05}$)O$_2$ active material:carbon black conductive material:polyvinylidene fluoride binder in a weight percent of about 94:3:3 were added to a N-methyl-2-pyrrolidone (NMP) solvent to prepare a mixture. The mixture was applied on a cathode collector, and drying and a roll pressing process were performed to manufacture a cathode structure. In this case, an aluminum foil with a thickness of about 10 μm was used as the cathode collector.

(Manufacture of anode electrode layer) A lithium foil with a thickness of about 300 μm was prepared as an anode electrode layer.

(Preparation of electrolyte) To a preliminary mixture obtained by mixing ethylene carbonate and ethyl methyl carbonate in a volume ratio of about 3:7, about 1 M of a lithium salt ($LiPF_6$) was added to prepare a mixture. To the mixture, fluoroethyl carbonate (FEC) and the additive of Product 2A were added to prepare an electrolyte composition. In this case, the fluoroethyl carbonate (FEC) was about 5 wt % based on the electrolyte composition, and the additive of Product 2A was about 10 wt % based on the electrolyte composition.

(Manufacture of separator) A polyethylene porous film was prepared as a separator.

(Manufacture of lithium battery) The cathode structure, separator, and anode electrode layer were stacked in order. Between the cathode structure and the anode electrode layer, the electrolyte composition was injected to manufacture a lithium battery of Experimental Example 2. The lithium battery of Experimental Example 2 may be a 2032-type coin cell.

(2) Evaluation of Charge and Discharge Characteristics of Lithium Battery

The charge and discharge characteristics of the lithium battery of Experimental Example 2 were evaluated. The evaluation of the charge and discharge characteristics of the lithium battery was performed by the same conditions explained in Experimental Example 1A.

5. Comparative Example 1

(1) Manufacture of Lithium Battery

A lithium battery of Comparative Example 1 was manufactured by the same method as for Experimental Example 1A. However, the electrolyte did not include an additive.

(2) Evaluation of Charge and Discharge Characteristics of Lithium Battery

The charge and discharge characteristics of the lithium battery of Comparative Example 1 were evaluated. The evaluation of the charge and discharge characteristics of the lithium battery was performed by the same conditions explained in Experimental Example 1A.

6. Comparative Example 2

(1) Manufacture of Lithium Battery

A lithium battery of Comparative Example 2 was manufactured by the same method as for Experimental Example 1A. The electrolyte included triphenyl phosphate (TPP) instead of the additive of Product 1A. Triphenyl phosphate may be about 10 wt % of the electrolyte.

(2) Evaluation of Charge and Discharge Characteristics of Lithium Battery

The charge and discharge characteristics of the lithium battery of Comparative Example 2 were evaluated. The evaluation of the charge and discharge characteristics of the lithium battery was performed by the same conditions explained in Experimental Example 1A.

[Evaluation of Flame Retardant Properties: Evaluation of Self-Extinguishing Time, SET]

The masses of a separator and an electrolyte were measured, respectively. After immersing the separator in the electrolyte for about 1 minute to about 6 hours, the electrolyte was lit. The time taken for extinguishing light, and the sum of the masses of the separator and electrolyte remaining after extinguishing light were measured. From these, the mass change of the electrolyte was calculated. The time taken for extinguishing light against the mass change of the electrolyte was calculated to obtain self-extinguishing time. The evaluation on the self-extinguishing time was repeated three times for each of the electrolyte of Experimental Example 1A, the electrolyte of Experimental Example 1B, the electrolyte of Experimental Example 1C, the electrolyte of Experimental Example 2, the electrolyte of Comparative Example 1, and the electrolyte of Comparative Example 2.

Table 1 shows the evaluation results of the self-extinguishing time for each of the electrolyte of Experimental Example 1A, the electrolyte of Experimental Example 11B, the electrolyte of Experimental Example 1C, the electrolyte of Experimental Example 2, the electrolyte of Comparative Example 1, and the electrolyte of Comparative Example 2. The self-extinguishing time is an average value of the results measured three times.

TABLE 1

|  | Self-extinguishing time (sec/g) | Standard deviation of self-extinguishing time |
|---|---|---|
| Electrolyte of Comparative Example 1 | 93.02 | 11.93 |
| Electrolyte of Comparative Example 2 | 70.79 | 9.49 |
| Electrolyte of Experimental Example 1A | 69.77 | 8.99 |
| Electrolyte of Experimental Example 1B | 76.74 | 5.70 |
| Electrolyte of Experimental Example 1C | 31.01 | 10.96 |
| Electrolyte of Experimental Example 2 | 38.76 | 10.93 |

Referring to Table 1, the electrolyte of Experimental Example 1A, the electrolyte of Experimental Example 11B, and the electrolyte of Experimental Example 1C showed greater self-extinguishing time than the electrolyte of Comparative Example 1, and the electrolyte of Comparative Example 2. If the self-extinguishing time increases, flame retardant properties may be deteriorated. The electrolyte of Comparative Example 1 could be evaluated rarely showing flame retardant properties. It could be confirmed that the electrolyte of Experimental Example 1A, the electrolyte of Experimental Example 1B, and the electrolyte of Experimental Example 1C showed improved flame retardant properties when compared to the electrolyte of Comparative Example 1, and the electrolyte of Comparative Example 2.

The electrolyte of Experimental Example 1A, and the electrolyte of Experimental Example 1B may include the additive represented by Formula 1A and the additive represented by Formula 1B, respectively. Formula 1A and Formula 1B may include P and N. Each of P and N may capture a gas. The gas may be a flame retardant gas or igniting gas. The electrolyte of Experimental Example 1A, and the electrolyte of Experimental Example 1B may show improved flame retardant properties.

The electrolyte of Experimental Example 1C may include the additive represented by Formula 1C. Formula 1C may have a vinylene structure. The vinylene structure may be relatively stable. The flame retardant properties of the electrolyte of Experimental Example 1C may be improved.

The electrolyte of Experimental Example 2 may include the additive represented by Formula 2A. Formula 2A includes an S element to improve flame retardant properties.

Figure 4A:
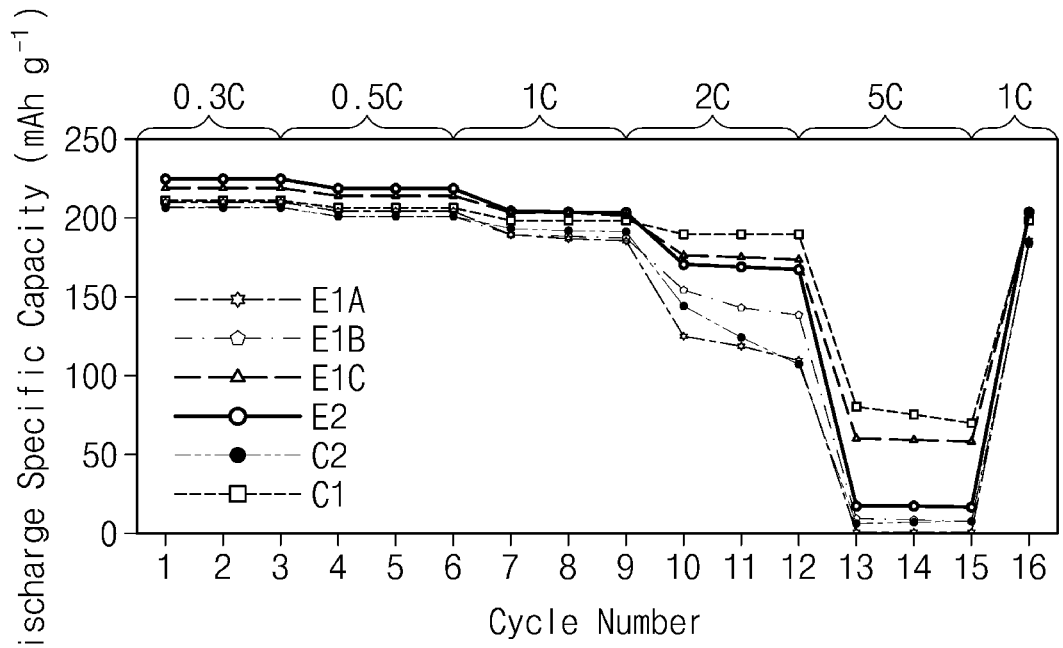
FIG. 4A shows charge and discharge evaluation results of lithium batteries of Experimental Example 1A, Experimental Example 1B, Experimental Example 1C, Experimental Example 2, Comparative Example 1, and Comparative Example 2, and is a graph showing discharge specific capacity with respect to cycle number.

FIG. 4A shows charge and discharge evaluation results of lithium batteries of Experimental Example 1A, Experimental Example 1B, Experimental Example 1C, Experimental Example 2, Comparative Example 1, and Comparative Example 2, and is a graph showing discharge specific capacity with respect to cycle number.

Figure 4B:
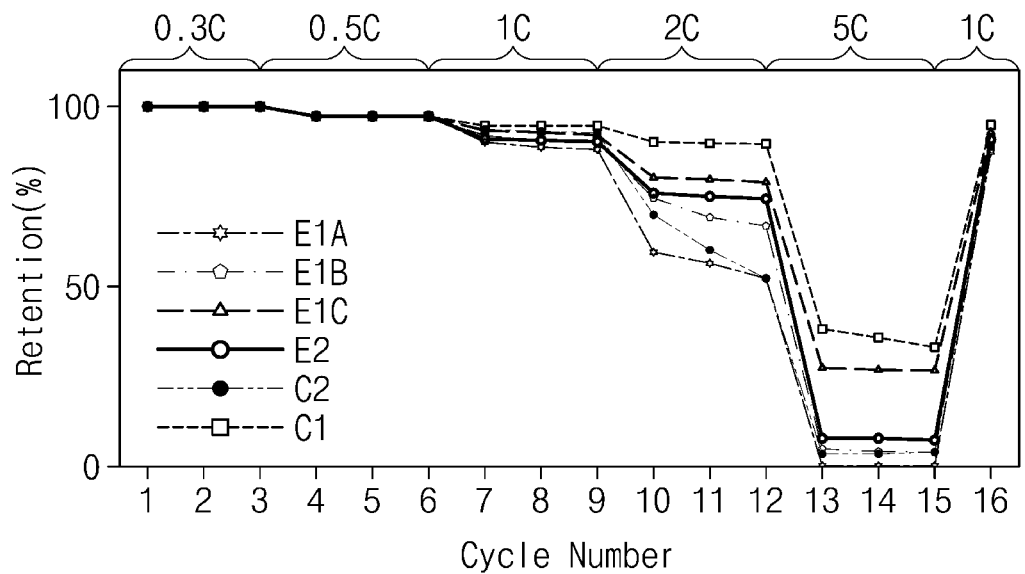
FIG. 4B shows charge and discharge evaluation results of lithium batteries of Experimental Example 1A, Experimental Example 1B, Experimental Example 1C, Experimental Example 2, Comparative Example 1, and Comparative Example 2, and is a graph showing retention with respect to cycle number.

FIG. 4B shows charge and discharge evaluation results of lithium batteries of Experimental Example 1A, Experimental Example 1B, Experimental Example 1C, Experimental Example 2, Comparative Example 1, and Comparative Example 2, and is a graph showing retention with respect to cycle number. In FIG. 4A and FIG. 4B, E1A, E1B, E1C, E2, C1, and C2 mean evaluation results of Experimental Example 1A, Experimental Example 1B, Experimental Example 1C, Experimental Example 2, Comparative Example 1, and Comparative Example 2, respectively.

Referring to FIG. 4A and FIG. 4B, the lithium batteries of Experimental Example 1A (E1A), Experimental Example 1B (E1B), Experimental Example 1C (E1C), and Experimental Example 2 (E2) showed improved charge and discharge characteristics than the lithium battery of Comparative Example 2 (C2). For example, the lithium batteries of Experimental Example 1A (E1A), Experimental Example 1B (E1B), Experimental Example 1C (E1C), and Experimental Example 2 (E2) showed improved rate performance properties than the lithium battery of Comparative Example 2 (C2). The rate performance properties may mean properties shown during charge and discharge lithium batteries in a rapid speed. In the cases of Experimental Example 1B (E1B) and Experimental Example 1C (E1C), improved rate performance properties may be shown when compared to Comparative Example 2 (C2).

The lithium batteries of Experimental Example 1A (E1A), Experimental Example 1B (E1B), Experimental Example 1C (E1C), and Experimental Example 2 (E2) showed capacities of about 200 mAh/g or more under conditions of about 0.3 C. It could be confirmed that the lithium batteries of Experimental Example 1A (E1A), Experimental Example 1B (E1B), Experimental Example 1C (E1C), and Experimental Example 2 (E2) had high energy densities. In the case of Comparative Example 2 (C2), a low capacity retention of about 3.5% under conditions of about 5 C could be shown. In the case of Experimental Example 1C (E12), a high capacity retention of about 27% under conditions of about 5 C could be shown.

Referring to FIG. 1 and FIG. 2 again, the electrolyte 300 according to embodiments may include an additive, and electrochemical stability at the interface between the first electrode layer 120 and the electrolyte 300, or between the second electrode layer 220 and the electrolyte 300 may be improved. If the additive includes a double bond, the electrochemical stability at the interface between the first electrode layer 120 and the electrolyte 300, or between the second electrode layer 220 and the electrolyte 300 may be improved even further. Otherwise, if the additive includes a P element or an N element, the electrochemical stability at the interface between the first electrode layer 120 and the electrolyte 300, or between the second electrode layer 220 and the electrolyte 300 may be improved even further. Accordingly, the coulomb efficiency of the lithium battery 1 according to embodiments may be improved. The lithium battery 1 may show high discharge capacity properties at a high current density.

Figure 5A:
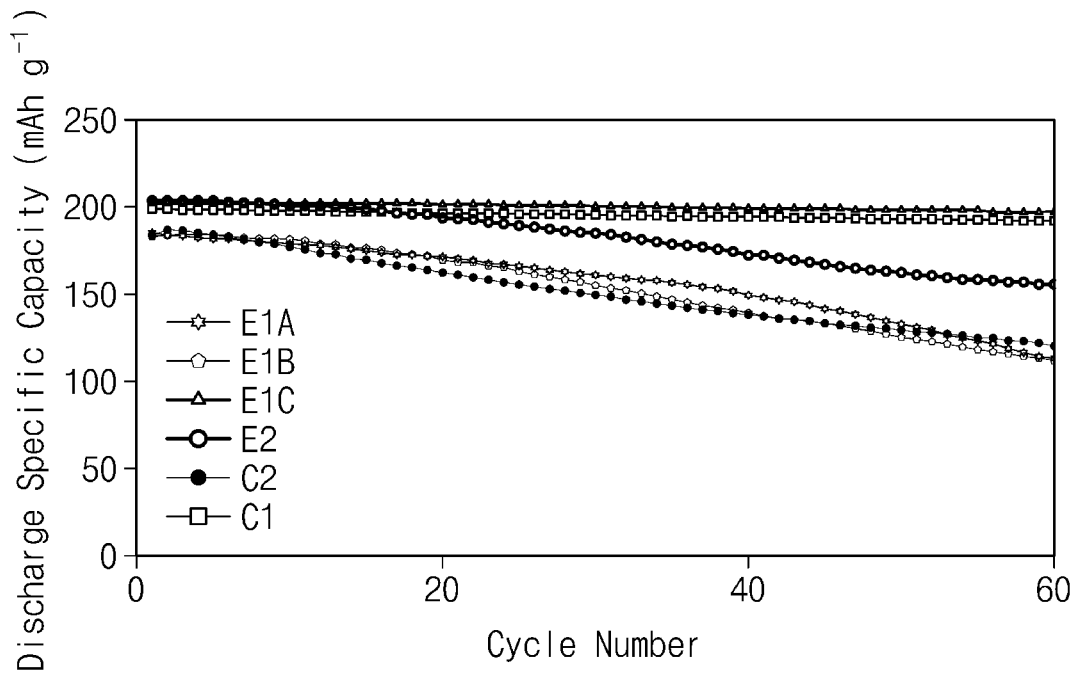
FIG. 5A is a diagram for explaining evaluation results of cycle characteristics of lithium batteries of Experimental Example 1A, Experimental Example 1B, Experimental Example 1C, Experimental Example 2, Comparative Example 1, and Comparative Example 2, and is a graph showing discharge specific capacity with respect to charge and discharge cycle number.

FIG. 5A is a diagram for explaining evaluation results of cycle characteristics of lithium batteries of Experimental Example 1A, Experimental Example 1B, Experimental Example 1C, Experimental Example 2, Comparative Example 1, and Comparative Example 2, and is a graph showing discharge specific capacity with respect to charge and discharge cycle number.

Figure 5B:
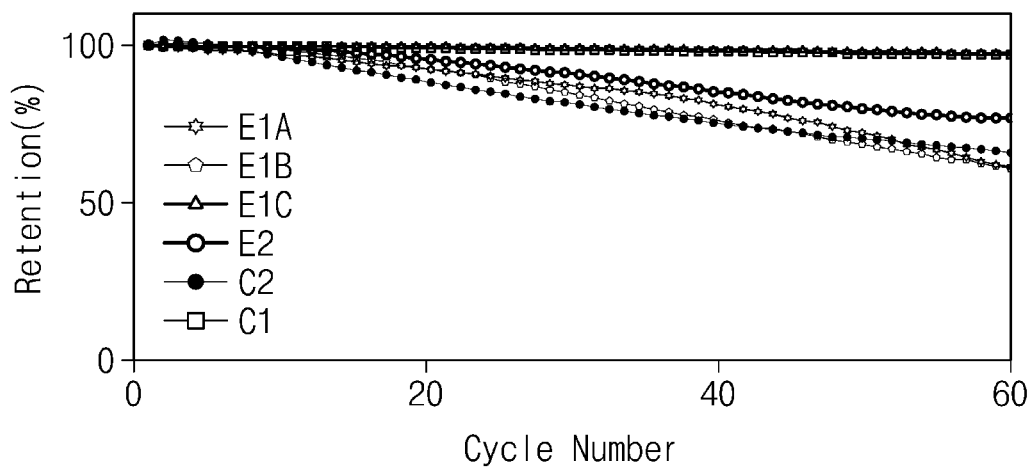
FIG. 5B is a diagram for explaining evaluation results of cycle characteristics of lithium batteries of Experimental Example 1A, Experimental Example 1B, Experimental Example 1C, Experimental Example 2, Comparative Example 1, and Comparative Example 2, and is a graph showing retention with respect to charge and discharge cycle number.

FIG. 5B is a diagram for explaining evaluation results of cycle characteristics of lithium batteries of Experimental Example 1A, Experimental Example 1B, Experimental Example 1C, Experimental Example 2, Comparative Example 1, and Comparative Example 2, and is a graph showing retention with respect to charge and discharge cycle number. In FIG. 5A and FIG. 5B, E1A, E1B, E1C, E2, C1, and C2 mean evaluation results of Experimental Example 1A, Experimental Example 1B, Experimental Example 1C, Experimental Example 2, Comparative Example 1, and Comparative Example 2, respectively.

Referring to FIG. 5A and FIG. 5B, after 60 cycles, Experimental Example 1A (E1A), Experimental Example 1B (E1B), Experimental Example 1C (E1C), and Experimental Example 2 (E2) showed higher capacity properties than Comparative Example 2 (C2). After 60 cycles, Comparative Example 2 (C2) showed low retention. The lithium battery of Experimental Example 1C (E1C) showed a retention of about 97.3% after 60 cycles. It could be confirmed that the lithium battery of Experimental Example 1C (E1C) showed improved retention.

In the case of Comparative Example 2 (C2), electrolyte decomposition reaction was observed at the interface between the electrolyte and the electrode layer.

Referring to FIG. 1 and FIG. 2 again, since the electrolyte includes the additive 330, interface properties at the interface between the electrolyte 300 and the first electrode layer 120, or at the interface between the electrolyte 300 and the second electrode layer 220 may be improved.

According to the inventive concept, an electrolyte composition and a lithium battery including the same may improve flame retardant properties. The lithium battery may show improved electrochemical properties.

Although the embodiments of the present invention have been described, it is understood that the present invention should not be limited to these embodiments, but various changes and modifications can be made by one ordinary skilled in the art within the spirit and scope of the present invention as hereinafter claimed.

What is claimed is:

1. A lithium battery, comprising:
a first electrode structure;
a second electrode structure separated from the first electrode structure; and
an electrolyte between the first electrode structure and the second electrode structure, wherein the electrolyte comprises:
a lithium salt;
an organic solvent; and
an additive comprising a material represented by the following Formula 1C and a material represented by the following Formula 2A:

[Formula 1C]

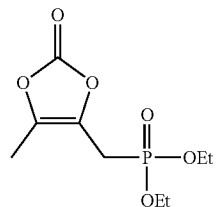

in Formula 1C, Et is $CH_2CH_3$:

[Formula 2A]

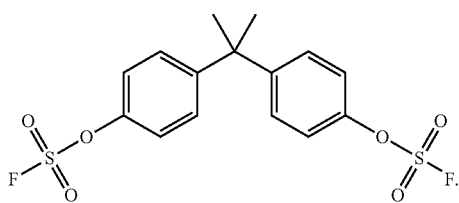

2. The lithium battery of claim 1, wherein a composition ratio of the additive is from about 0.5 wt % to about 30 wt %.

3. The lithium battery of claim 1, wherein
the first electrode structure comprises a first collector and a first electrode layer on the first collector, and
the first electrode layer is provided between the first collector and the electrolyte.

4. The lithium battery of claim 3, wherein the second electrode structure comprises a second collector and a second electrode layer on the second collector, and
the second electrode layer is provided between the second collector and the electrolyte.

5. The lithium battery of claim 4, wherein the electrolyte directly contacts the first electrode layer and the second electrode layer.

6. The lithium battery of claim 1, wherein the lithium battery further comprises a separator between the first electrode structure and the second electrode structure, and
the electrolyte is provided between the first electrode structure and the separator, and between the second electrode structure and the separator.

7. An electrolyte composition, comprising:
a lithium salt;
an organic solvent; and
an additive comprising at least one among a material represented by the following Formula 1, Formula 1C, and a material represented by the following Formula 2A:

[Formula 1]

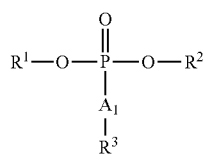

in Formula 1, $A_1$ is Carbon (C) $R^1$ and $R^2$ are each independently an alkyl group of 1 to 4 carbon atoms, a halogen-substituted alkyl group of 1 to 4 carbon atoms, or an alkenyl group of 2 to 4 carbon atoms, $R^4$ is hydrogen, an alkyl group of 1 to 4 carbon atoms, a fluorine-substituted alkyl group of 1 to 4 carbon atoms, an alkenyl group of 2 to 4 carbon atoms, an alkynyl group of 3 to 4 carbon atoms, or a substituted or unsubstituted heterocyclic compound of 3 to 6 carbon atoms, and $R^3$ is dimethyl vinyl carbonate (4,5-dimethyl-1,3-dioxol-2-one), propylene carbonate or butylene carbonate (2,3-butylene carbonate):

[Formula 1C]

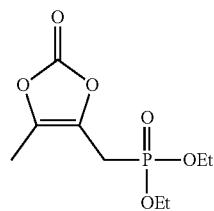

in Formula 1C, Et is $CH_2CH_3$:

[Formula 2A]

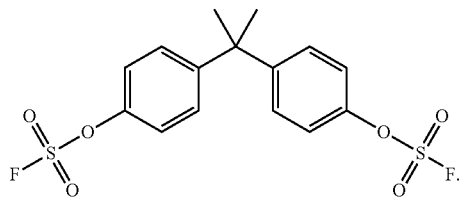

8. The electrolyte composition of claim 7, wherein
a molarity of the lithium salt is about 1 M to about 3 M, and
a composition ratio of the additive is about 0.5 wt % to about 30 wt %.

9. The electrolyte composition of claim 7, wherein the lithium salt comprises at least one among $LiPF_6$, $LiBF_4$, $LiSbF_6$, $LiAsF_6$, $LiClO_4$, $LIN(C_2F_5SO_2)_2$, $LIN(CF_3SO_2)_2$, $CF_3SO_3Li$, $LiC(CF_3SO_2)_3$, and $LiC_4BO_8$.

10. The electrolyte composition of claim 7, wherein the organic solvent comprises at least one among gamma-butyrolactone (g-butyrolactone), ethylene carbonate, propylene carbonate, glycerin carbonate, dimethyl carbonate, diethyl carbonate, ethyl methyl carbonate, dimethoxyethane, and dimethyl ethylene carbonate.

11. The electrolyte composition of claim 7, wherein the electrolyte composition further comprises an auxiliary agent, and
the auxiliary agent comprises at least one selected from fluoroethylene carbonate or vinylene carbonate.

* * * * *